(12) United States Patent
Ruan

(10) Patent No.: US 7,374,152 B2
(45) Date of Patent: May 20, 2008

(54) HAND LEVER FOR A BINDING MACHINE

(76) Inventor: Bu Qing Ruan, Yuhuan Top Sun Machinery Tool Co. Ltd., Chengbei Industrial Area Yuhuan, Zhi Jiang (CN) 317600

( * ) Notice: Subject to any disclaimer, the term of this patent is extended or adjusted under 35 U.S.C. 154(b) by 216 days.

(21) Appl. No.: 10/821,987

(22) Filed: Apr. 12, 2004

(65) Prior Publication Data

US 2005/0211959 A1   Sep. 29, 2005
US 2007/0102687 A9   May 10, 2007

(30) Foreign Application Priority Data

Feb. 5, 2004   (CN) .................. 2004 2 0020002

(51) Int. Cl.
*B25B 25/00* (2006.01)

(52) U.S. Cl. ..................... 254/217; 254/223

(58) Field of Classification Search .......... 254/217, 254/218, 222, 223, 369; 140/123.5; 24/68 CD
See application file for complete search history.

(56) References Cited

U.S. PATENT DOCUMENTS

| | | | |
|---|---|---|---|
| 3,602,065 A * | 8/1971 | Ratcliff | .......... 74/524 |
| 3,749,366 A * | 7/1973 | Brucker | .......... 24/68 CD |
| 4,542,883 A | 9/1985 | Rutzki | |
| 5,156,506 A | 10/1992 | Bailey | |
| 5,271,606 A | 12/1993 | Kamper | |
| 5,855,045 A * | 1/1999 | Miura | .......... 24/68 CD |
| 6,769,155 B2 * | 8/2004 | Hess et al. | .......... 24/68 SK |

* cited by examiner

*Primary Examiner*—Evan H. Langdon
(74) *Attorney, Agent, or Firm*—Bergman & Song LLP

(57) ABSTRACT

A binding machine includes a tightening mechanism adapted to tension a belt and a limiting mechanism adapted to limit tensioning of the belt. The tightening mechanism includes, for example, a ratchet and a pawl coupled to a body of the tightening mechanism. A handle is adapted to rotate the ratchet in a first direction in response to a first force applied to the handle. The pawl is adapted to prevent the ratchet from returning in a second direction when the first force is released. A spring mechanism allows the handle to indicate when a second force opposing the first force achieves an established magnitude.

16 Claims, 4 Drawing Sheets

HAND LEVER FOR A BINDING MACHINE

CROSS-REFERENCE TO RELATED APPLICATIONS

The present application claims priority to Chinese Patent Application Number 200420020002.9 filed on Feb. 5, 2004.

FIELD OF THE INVENTION

This invention belongs to the technical field of mechanics, and it involves a type of binding tool, specifically, a type of binding machine used for transport vehicles and other large, non-standard cargo.

BACKGROUND

When a truck is transporting cargo, it is necessary to bind up the cargo. If common nylon cord or steel wire is employed for binding, not only is the efficiency low, but also operations are very strenuous. By using a binding machine one is able to quickly and conveniently bind cargo into a fixed position. It can bind as one wishes on trucks, and operations are simple and save on labor and time. As a result, it is now widely used.

When using a binding machine to bind cargo, it requires appropriate binding strength. If the binding strength is excessively large, this can cause the cargo to be damaged; at the same time, excessively great binding strength also easily results in damage to the binding machine and the fixed end of the band. On the contrary, if the binding force is excessively small, the cargo will then be loose and will not have any binding effects.

However, in the existing structures of binding machines, each time binding operations are carried out on cargo, the level of binding is determined based on the experiences and feelings of the operator. The binding machines are unable to indicate to the operator as to whether or not the binding force has already reached an appropriate level. This inadequacy directly affects the operating speed and binding quality of binding machines.

SUMMARY OF THE INVENTION

The aims of this invention are to address the above-mentioned problem that is present in existing binding machines, provide a new and innovative hand lever for binding machines, as well as make improvements on the hand lever so that the binding machine is able to indicate to an operator whether or not the binding machine has already realized requirements during usage so as to raise the binding quality and operating speed of binding machines.

The aims of this invention cart be realized by means of the following technological plans: this binding machine hand lever includes, a handle and side plates. One end of the side plate is firmly connected with the handle, and the other end is cup jointed on the reel of the binding machine. Its special characteristic is that the said side plate is composed from connecting piece 1 and connecting piece 2. Within this, the end section of connecting piece I is firmly connected with the handle, the end section of connecting piece 2 is cup jointed on the reel of the binding machine, and the other end sections of connecting piece 1 and connecting piece 2 are both cup jointed on a pin roll. Moreover, a spring is installed in the area of the pin roll and the two ends of the spring are separately and firmly connected on connecting piece 1 and connecting piece 2. A block edge is installed on connecting piece 1 or connecting piece 2 to prevent the bending that results from connecting piece 1 and connecting piece 2 sustaining elastic force from the spring.

In this binding machine hand lever, the side plate is divided into the two sections of connecting piece 1 and connecting piece 2 which are joined to each other with a hinge, and a spring and block edge are used so that both are kept straight and extended. When operating the binding machine, throwing the hand lever causes the direction of the binding machine's notch wheel reel to be opposite of the direction of the applied force of the spring on the hand lever. During the early period of throwing the hand lever to create reel movement, the tension force is quite small and the side plate of the hand lever is extended straight. Following the continuous tightening of the band, the binding force continuously enlarges and the tension force on the hand lever also correspondingly enlarges. When the required tension force slightly exceeds the elastic force of the spring, there is no way that the throwing of the hand lever will cause the rotation of the roller of the hand lever. It is only able to allow connecting piece 1 to overcome the elastic force of the spring and rotate a certain angle relative to connecting piece 2. At this time, it then indicates to the operator that the binding force of this binding machine has already realized suitable requirements.

In the above-mentioned binding machine hand lever, the said side plate has two plates, and the end sections of connecting piece 1 in the two side plates are separately and firmly connected to the two sides of the handle. The installation of two side plates can raise the mechanical strength of the binding machine and lengthen the service life of the products.

In the above-mentioned binding machine hand lever, cross bar 1 is fixed between the said two connecting pieces 1, and one end of the spring is fixed on cross bar 1.

In the above-mentioned binding machine hand lever, cross bar 2 is fixed between the said two connecting pieces 2, and the other end of the spring is fixed on cross bar 2.

When compared with existing technology, this binding machine hand lever utilizes an installed spring to control the binding force of the binding machine wherein it can avoid the binding force being excessively large during operations and causing the bound objects. binding machines and fixed ends from being damaged as a result of overload. The design of this binding machine hand lever is rational, mechanical stability is good, and it possesses very high practical value.

Within these: 1. Side plate; 11. Connecting piece 1; 12. Connecting piece 2; 13. Block edge; 14. Cross bar 1; 15. Cross bar 2; 2. Handle; 3. Spring; 4. Pin roll; 5. Reel; 6. Notch wheel; 7. Adjustable band; 8. Body; 9. Fixed position band.

DETAILED DESCRIPTION OF THE INVENTION

Figure 1:
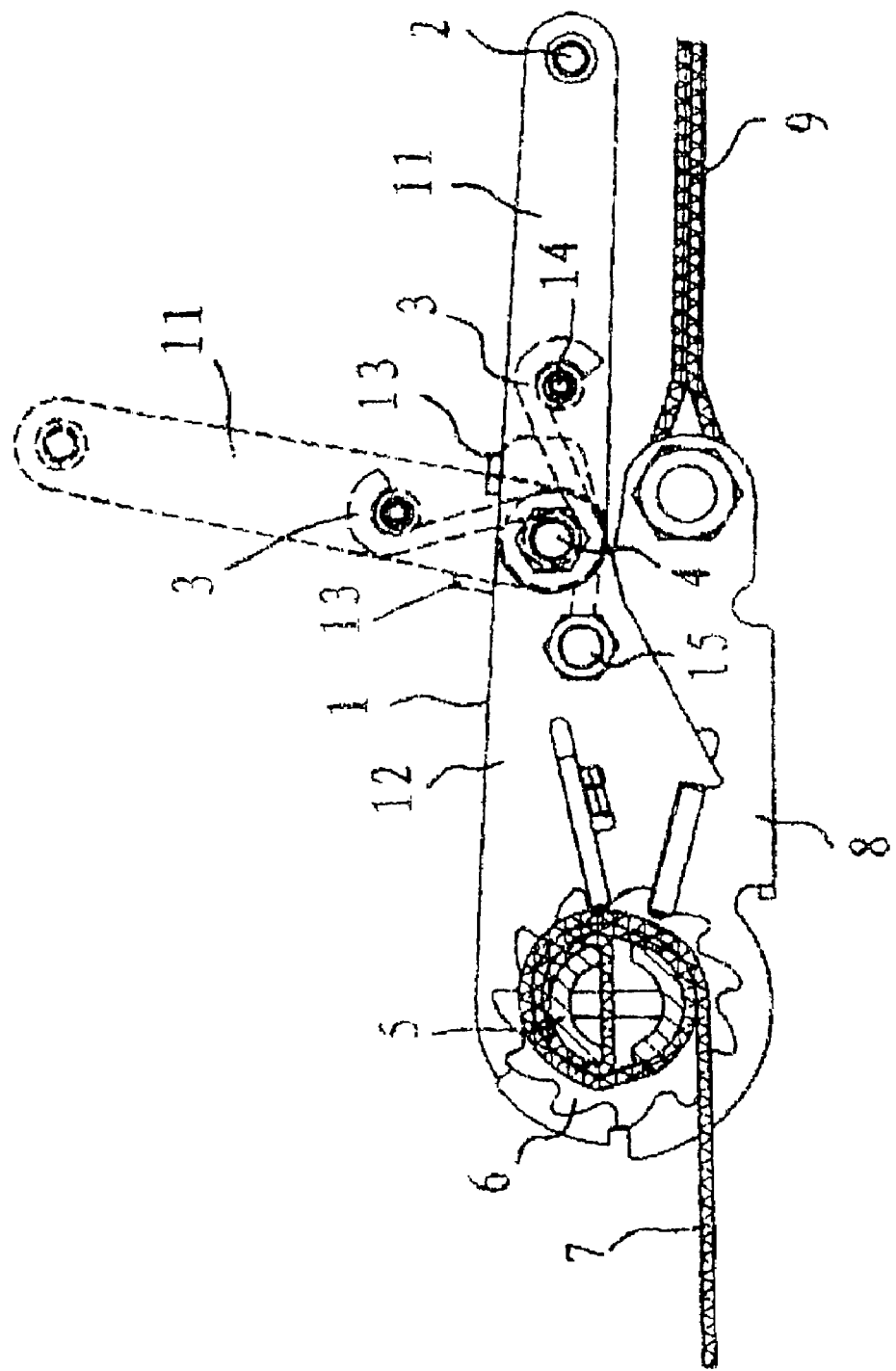
FIG. 1 is a structural schematic of the binding machine with the hand lever of this invention.

As shown in FIG. 1, the binding machine includes a handle, body (8), reel (5), notch wheel (6), adjustable band (7), fixed position band (9), and other parts. The inside end of the fixed position band (9) is firmly connected on the body (8), the adjustable band (7) then winds on the reel (5), and the notch wheel (6) is firmly connected to the reel (5).

When the binding machine is used, the outside end of the fixed position band (9) and adjustable band (7) are fixed on the truck or cargo, and afterwards the hand lever is turned repeatedly setting in motion the notch wheel (6), rotating the reel (5) that is firmly connected with the notch wheel (6), and tightening the adjustable band. Lastly, the cargo is tightened and fixed in place.

Figure 2:
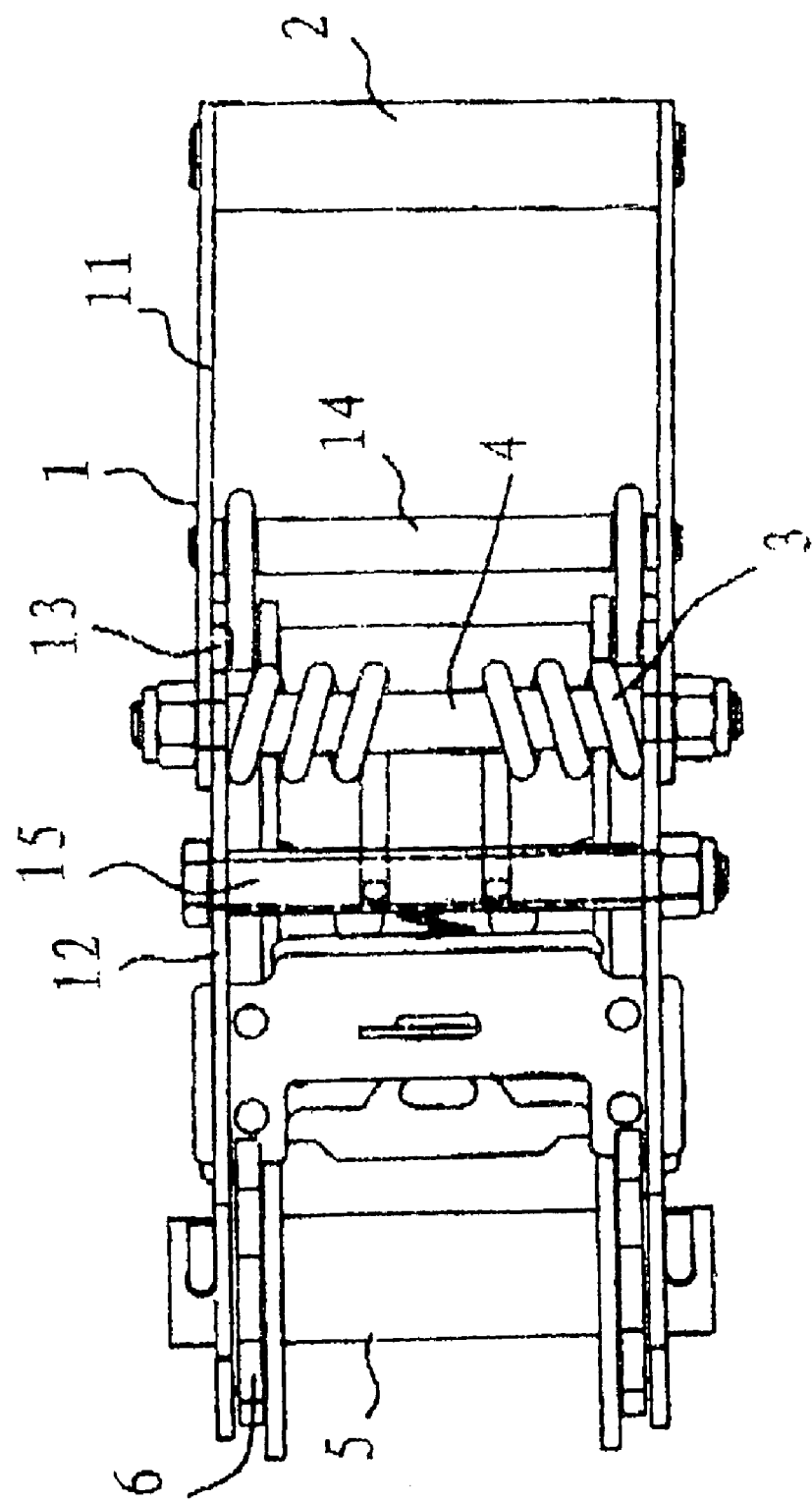
FIG. 2 is a front view of the binding machine with the hand lever of this invention.
Figure 3:
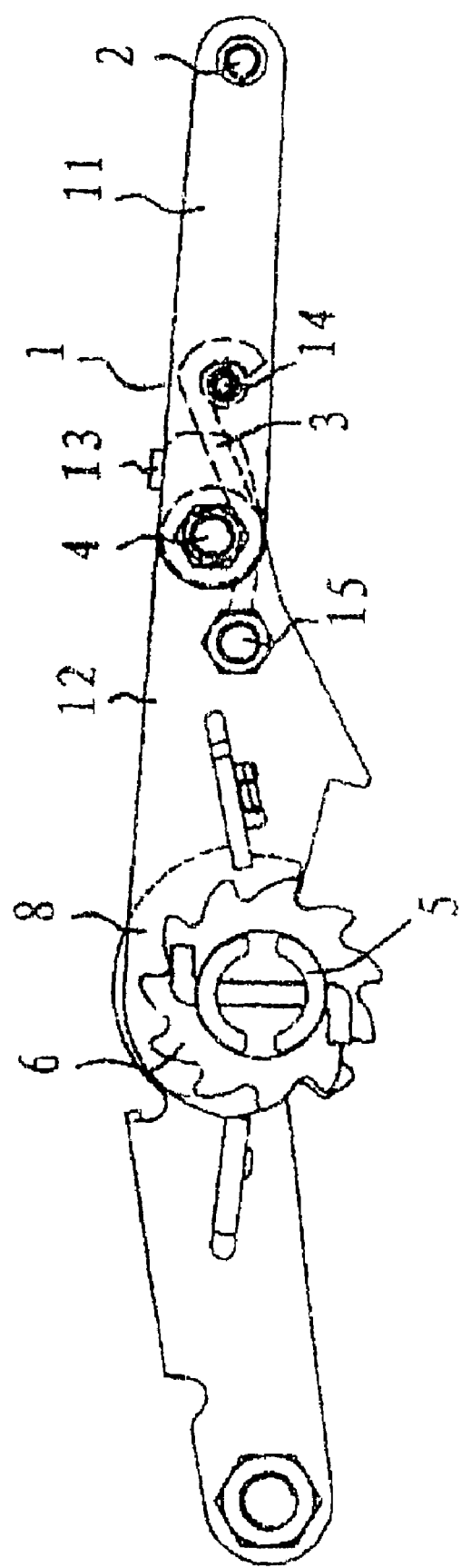
FIG. 3 is a side view of the binding machine with the hand lever of this invention in a loosened state.

As shown in FIGS. 1, 2 and 3. in this example of implementation, the hand lever of the binding machine includes a handle (2) and two side plates (1). Each plate is composed from connecting piece 1 (11) and connecting piece 2 (12), connecting piece 1 (11) is firmly connected to the end section of the handle (2), and the end section of connecting piece 2 (12) is cup jointed on the reel (5) of the binding machine. The other ends of connecting piece 1 (11) and connecting piece 2 (12) are both cup jointed on the pin roll (4). It is clear that connecting piece 1 (11) and connecting piece 2 (12) are joined to each other with a hinge.

As shown in FIG. 2, in this example of implementation, the spring (3) is cup jointed on the pin roll (4). At the same time, cross bar 1 (14) is fixed between the two connecting pieces 1 (11), and cross bar 2 (15) is fixed between the two connecting pieces 2 (12). The two ends of the spring (3) are separately fixed on cross bar 1 (14) and cross bar 2 (15). Aside from being fixed on the ends of the spring (3), cross bar 1 (14) and cross bar 2 (15) also connect the two connecting pieces 1 (11) and two connecting pieces 2 (12) together so as to raise the firmness of the hand lever 3.

As shown in FIGS. 2. 3 and 4, the block edge (13) is installed on the edge of connecting piece 1 (11), the block edge (13) bends towards the outside to block the edge of connecting piece 2 (12), and it is in the direction that blocks the elastic force effects of the spring (3). As a result, the blocking effects of the block edge (13) are used to keep connecting piece 1 (11) and connecting piece 2 (12) extended and straight. FIG. 1 displays the position of connecting piece 1 (11) shown in the example of implementation.

It is evident that the installation of the block edge (13) on the edge of connecting piece 2 (12) is also completely feasible.

Figure 4:
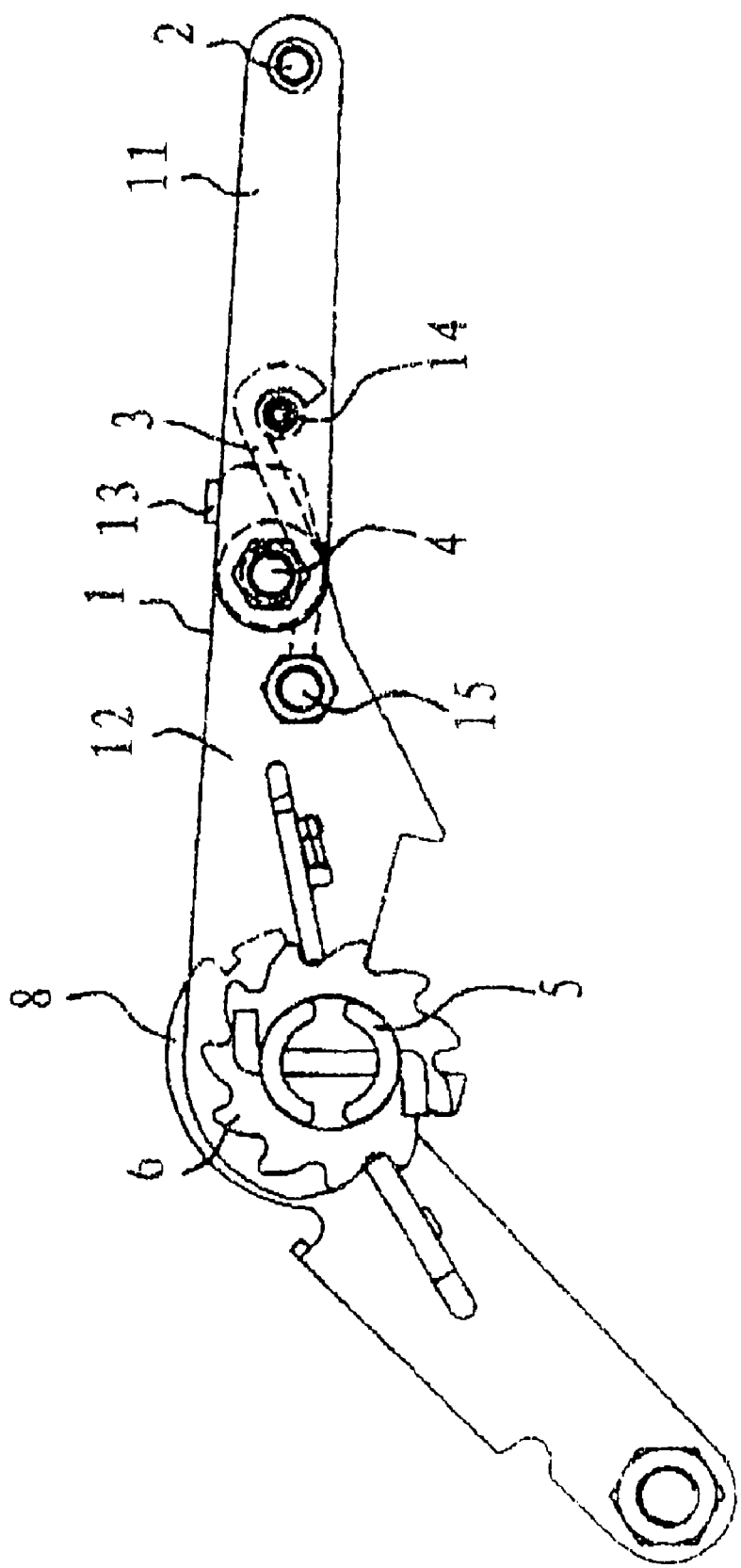
FIG. 4 is a side view of the binding machine with the hand lever of this invention wherein the hand is in a wound up state.

As shown in FIG. 4. turning the hand lever in the opposite direction along the elastic force of the spring (3) also causes the reel (5) to rotate in the direction of tightening the adjustable band, and the block edge (13) will not have any blocking effects.

If the required tightening force reaches or slightly exceeds the elastic force of the spring (3) during the course of turning the hand lever, this will cause connecting piece 1 (11) to overcome the elastic force of the spring (3) and rotate a certain angle in relation to connecting piece 2 (12). The position of connecting piece 1 (11) as shown by the broken line in FIG. 1 indicates that the binding force of the binding machine has already reached an appropriate level by the operator, and that the tightening operations can be stopped.

The invention claimed is:

1. A binding machine comprising:
   a body portion;
   a ratchet device coupled to said body portion;
   a first handle portion including first and second side members, said first and second side members being disposed in substantially parallel spaced relation with respect to one another, said first handle portion being coupled to said ratchet device for rotational activation of said ratchet device;
   a second handle portion including third and fourth side members, said third and fourth side members being disposed in substantially parallel spaced relation with respect to one another, said second handle portion being pivotally coupled to said first handle portion at respective mutually proximate ends thereof;
   a helical spring, said helical spring being disposed between said first and second side members, said helical spring being adapted to provide a monotonically increasing force in opposition to a pivotal displacement of said first handle portion with respect to said second handle portion;
   an inner cross member, said inner cross member having a first end coupled to said first side member and a second end coupled to said second side member, said helical spring having a first end coupled to said inner cross member; and
   an outer cross member, said outer cross member having a third end coupled to said third side member and a fourth end coupled to said fourth side member, said helical spring having a second end coupled to said outer cross member.

2. A binding machine as defined in claim 1 further comprising:
   a further helical spring, said further helical spring being disposed between said first and second side members, said helical spring and said further helical spring being wound in opposite directions.

3. A binding machine as defined in claim 1 wherein said helical spring includes a first end portion and a second end portion, said first end portion being substantially fixedly coupled to said first handle portion and said second end portion being substantially fixedly coupled to said second handle portion.

4. A binding machine as defined in claim 1 wherein said first, second, third and fourth side members include respective first, second, third and fourth through-holes, said first, second, third and fourth through-holes being disposed coaxially with respect to one another about a longitudinal axis of a shaft, said shaft being adapted to effect said pivotal coupling of said second handle portion to said first handle portion.

5. A binding machine as defined in claim 4 wherein a coil of said helical spring is disposed coaxially about said shaft.

6. A binding machine as defined in claim 5 wherein a flexure of said helical spring is adapted to exert a substantially negligible torsional force on said shaft.

7. A binding machine as defined in claim 1 wherein, said inner cross member includes a bore, said bore being disposed substantially perpendicular to a longitudinal axis of said inner cross member, said first end being disposed within said bore.

8. A binding machine as defined in claim 1 wherein said outer cross member includes circumferential groove in a surface thereof, and wherein said second end of said helical spring includes a hooked portion, said hooked portion being disposed within said circumferential groove.

9. A binding machine as defined in claim 1 wherein said first handle portion, said second handle portion and said helical spring define a torque indicator, said torque indicator being adapted to indicate a torque related to said rotational activation of said ratchet device.

10. A binding machine as defined in claim 9 wherein a magnitude of said torque corresponds to a deflection of said helical spring.

11. A binding machine as defined in claim 10 wherein said deflection of said helical spring comprises an angular deflection of said helical spring.

12. A binding machine as defined in claim 10 wherein said deflection of said helical spring corresponds to a pivotal motion of said first handle portion with respect to said second handle portion.

13. A binding machine as defined in claim 10 further comprising a reel, said reel being coupled to said ratchet device; and a band, said band being coupled to said reel, wherein said magnitude of said torque is related to a tension of said band.

14. A binding machine as defined in claim 1 wherein said first handle portion is pivotally coupled to said second handle portion about a pin roll.

15. A binding machine as defined in claim 14 wherein said helical spring has a longitudinal axis disposed substantially parallel to a longitudinal axis of said pin roll, said helical spring having an internal circumference, said pin roll being disposed within said internal circumference of said helical spring.

16. A binding machine as defined in claim 1 further comprising a pawl, said pawl being coupled to said body portion, said pawl being adapted to control a motion of said ratchet device.

* * * * *

UNITED STATES PATENT AND TRADEMARK OFFICE
CERTIFICATE OF CORRECTION

PATENT NO.         : 7,374,152 B2                                   Page 1 of 1
APPLICATION NO.    : 10/821987
DATED              : May 20, 2008
INVENTOR(S)        : Bu Qin Ruan It is certified that error appears in the above-identified patent and that said Letters Patent is hereby corrected as shown below:

Title Page, item (76) should read: Inventor:   Bu Qin Ruan, Yuhuan Top Sun Machinery Tool Co. Ltd., Chengbei Industrial Area Yuhuan, Zhi Jiang (CN) 317600

Signed and Sealed this

First Day of December, 2009

David J. Kappos
*Director of the United States Patent and Trademark Office*